W. H. BRADLEY.
APPARATUS FOR REMOVING ASHES FROM GAS PRODUCERS.
APPLICATION FILED FEB. 8, 1912.
1,049,561.
Patented Jan. 7, 1913.
2 SHEETS—SHEET 1.
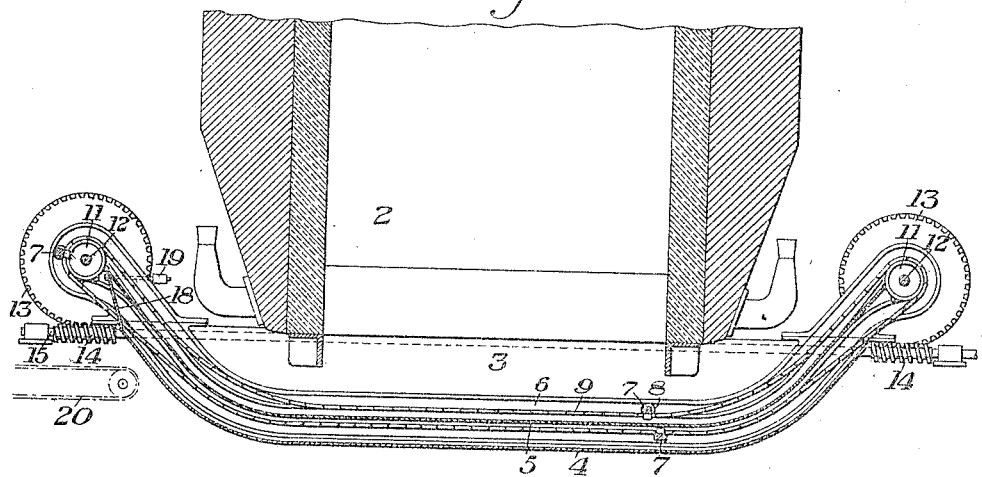
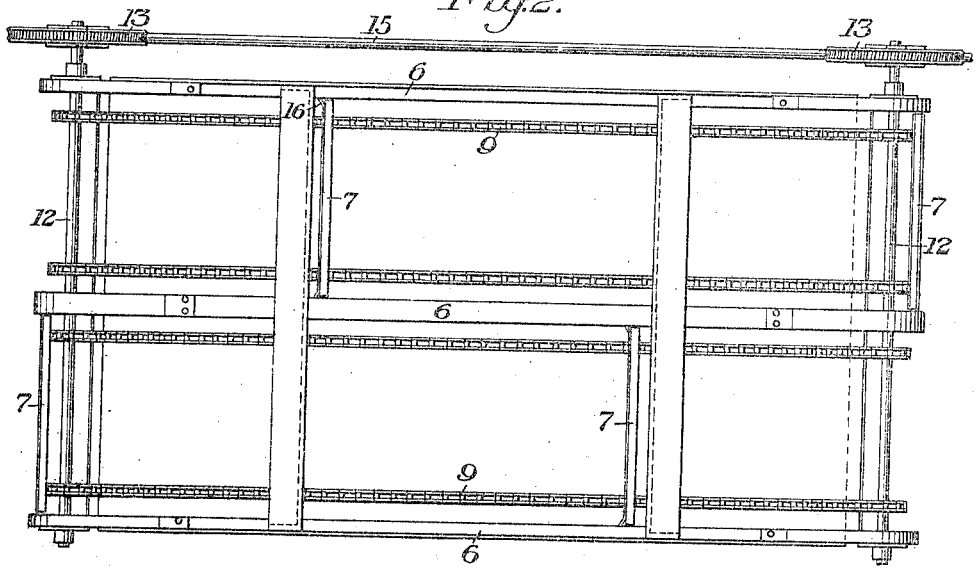

W. H. BRADLEY.
APPARATUS FOR REMOVING ASHES FROM GAS PRODUCERS.
APPLICATION FILED FEB. 8, 1912.

1,049,561.

Patented Jan. 7, 1913.

2 SHEETS—SHEET 2.

WITNESSES
R A Balderson
W Famariss

INVENTOR
William H. Bradley
by Bakewell, Byrnes & Parmelee
his attys

UNITED STATES PATENT OFFICE.

WILLIAM H. BRADLEY, OF PITTSBURGH, PENNSYLVANIA, ASSIGNOR TO DUFF PATENTS COMPANY, OF PITTSBURGH, PENNSYLVANIA, A CORPORATION OF PENNSYLVANIA.

APPARATUS FOR REMOVING ASHES FROM GAS-PRODUCERS.

1,049,561.   Specification of Letters Patent.   Patented Jan. 7, 1913.

Application filed February 8, 1912. Serial No. 676,461.

*To all whom it may concern:*

Be it known that I, WILLIAM H. BRADLEY, a resident of Pittsburgh, in the county of Allegheny and State of Pennsylvania, have invented a new and useful Improvement in Apparatus for Removing Ashes from Gas-Producers, of which the following is a full, clear, and exact description, reference being had to the accompanying drawings, forming part of this specification, in which—

Figure 3:
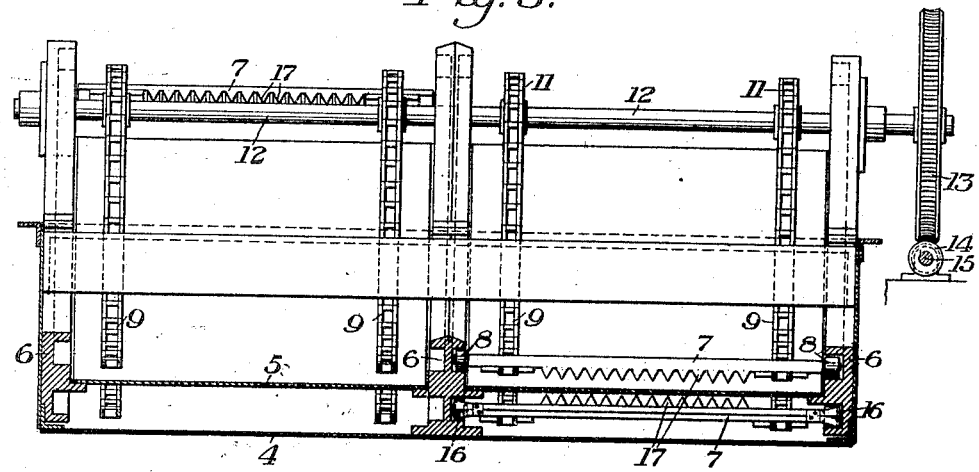
Figure 4:
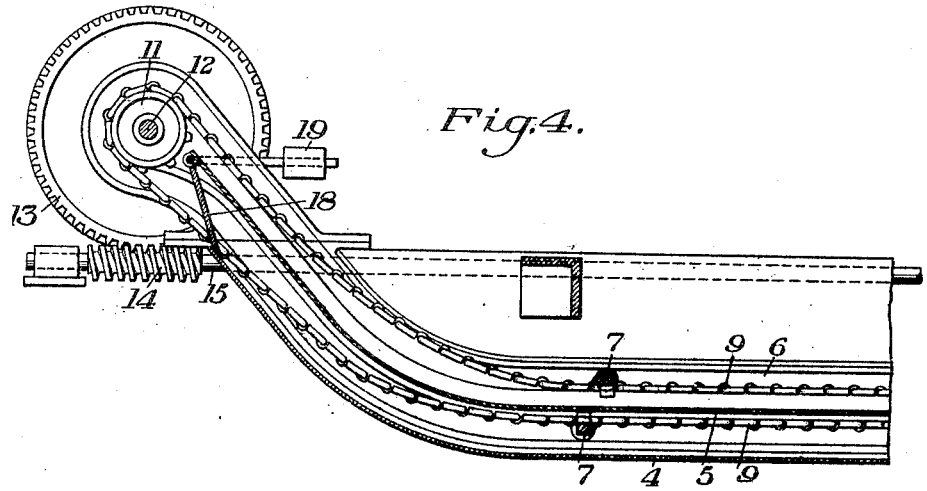
Figure 5:
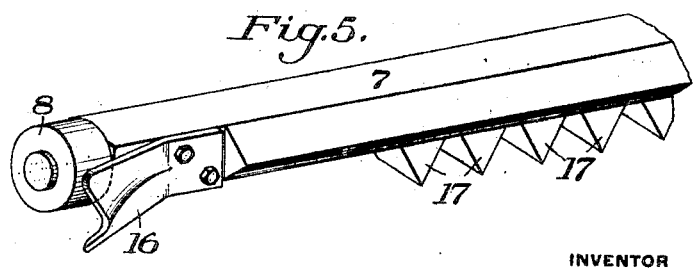

Figure 1 is a vertical section showing a portion of a gas producer having apparatus embodying my invention in connection therewith. Fig. 2 is a plan view of a portion of the apparatus. Fig. 3 is a transverse vertical section of the same. Fig. 4 is a detail view partly in elevation and partly in vertical section, of a portion of the apparatus; and Fig. 5 is a perspective view of one of the ash pushing or removing bars.

My invention has relation to apparatus for removing ashes from gas producers; and is more particularly applicable to that type of producer in which the bottom portion is sealed by a water pan or bosh into which the ashes are discharged.

The object of my invention is to provide apparatus for this purpose, of simple and effective character, and which can be installed and operated at a comparatively low cost.

The nature of my invention will be best understood by reference to the accompanying drawings in which I have shown the preferred embodiment thereof and which will now be described, it being premised, however, that various changes may be made in the details of construction and arrangement of the parts by those skilled in the art, without departing from the spirit and scope of my invention, as defined in the appended claims.

In these drawings, the numeral 2 designates the lower portion of the stack of a gas producer having the open bottom 3 extending downwardly within and below the water level of a water pan or bosh 4. Placed within this pan or bosh, and separated from the bottom and end walls thereof, is an inner pan or plate 5, whose upper surface is designed to receive the ashes discharged from the producer and whose end portions extend upwardly beyond the ends of the outer pan 4. The pan 4 is provided with suitable tracks or guides 6 in which travel transversely arranged pusher bars 7 having wheels or rolls 8 at their ends. These bars are carried by endless chains 9 to which they are attached at suitable intervals. It will ordinarily be preferable to provide at least two pairs of chains arranged side by side, as shown in Figs. 2 and 3, each chain having its own series of bars 7. For small producers, however, a single pair of chains, with the bars of sufficient length to cover substantially the entire width of the water pan may be employed; and more than two pairs of chains can also be employed for large producers, if desired.

The chains 9 pass upwardly at each end of the furnace around carrier wheels 11 which are mounted on the shaft 12. These shafts are shown as being driven by means of worm wheels 13 which are engaged by worms 14 on a driven shaft 15, which may be operated by any suitable motor, not shown.

The guides 6 for the wheels 8 at the ends of the bars 7 are made continuous by extending them upwardly at each end of the furnace and carrying them around the shafts 12, as shown in Figs. 1 and 4.

In order to prevent the grooves from becoming clogged from ashes or other obstructions, I provide the bars 7 with plows 16 (see Fig. 5), which plows are arranged to run in said grooves and throw out any obstructions which may become lodged therein. The bars may be of various forms, and are preferably provided each with a series of teeth 17, such as indicated. Where two or more sets of chains are employed side by side in starting the apparatus the different sets of chains are preferably so placed that the bars 7 of one pair of chains will alternate with those of another pair of chains, so that both pairs of chains will not be pulling a maximum load at the same time.

18 designates a trap door for closing the opening between the inner and outer pans at the discharge end of the apparatus to prevent the ashes, as they are discharged, from flowing into this space. This door is shown as normally held closed by means of a counterweight 19.

The operation will be readily understood. The chains are preferably given a continuous slow movement by means of the driving gearing and the bars 7 scrape and push the ashes deposited upon the inner pan toward the discharge end of the apparatus, where they are discharged over the end of the inner pan.

Any suitable receptacle or conveyer, such as indicated at 20 in Fig. 1, may be provided to receive the ashes as they are discharged.

The advantages of my invention will be apparent to those skilled in the art, since it provides apparatus of very simple and efficient character by means of which the water pan or bosh of a gas producer may be kept free from ashes without manual labor, and at a comparatively low cost of installation and up-keep, the apparatus being inexpensive in construction and not of a character to require numerous repairs.

I do not wish to limit myself to the details of the arrangement which I have shown and described, since it is obvious that various changes may be made. Thus, any suitable driving gear may be employed for the chains, the three or four pusher bars may be of various forms and arrangements, and numerous other changes may be made.

In order to hold down the end portions of the chains between the end sprocket wheels and the hold down devices, I may employ sprocket wheels engaging said chains intermediate of these points, both for the in-going and out-going end portions of the chains.

What I claim is:

1. In apparatus of the character described, the combination of a gas producer having a water pan or bosh sealing its lower end, of an inner plate or pan arranged to receive the ashes discharged from the producer, said plate or pan having an upwardly deflected discharging end portion which extends beyond the end of the water pan or bosh, and a pair of conveyer chains arranged to travel around the inner plate or pan and carrying transversely arranged bars which engage the ashes on the said inner plate or pan and effect their discharge at the end of the same beyond the end of the water pan or bosh; substantially as described.

2. In apparatus of the character described, the combination with a gas producer having a water pan or bosh, of an inner plate or pan arranged within the first named pan, and extending upwardly at its end beyond the end of the first named pan, a pair of conveyer chains mounted to travel around the inner plate or pan, and a plurality of transverse bars carried by said chain which engage the ashes on the said inner plate or pan and effect their discharge beyond the end of the water pan or bosh; substantially as described.

3. In apparatus of the character described, the combination with a gas producer having a water bosh, of an inner plate or pan within said bosh, said plate or pan having an upwardly inclined discharging portion extending laterally of the furnace beyond the end of the water bosh, endless conveyer chains arranged to travel through said bosh around said plate or pan, transverse bars carried by said chains and which engage the ashes on said plate or pan and effect their discharge therefrom beyond the end of the bosh, and means for guiding said bars and chains; substantially as described.

4. In apparatus of the character described, the combination with a gas producer having a water bosh, of an inner plate or pan within said bosh, endless conveyer chains arranged to travel through said bosh around said plate or pan, transverse bars carried by said chains, and wheels on the ends of said bars, tracks for said wheels, and plows carried by the bars for cleaning the tracks; substantially as described.

In testimony whereof, I have hereunto set my hand.

WILLIAM H. BRADLEY.

Witnesses:
G. M. VIERS,
H. M. CORWIN.